(12) United States Patent
Jenkins

(10) Patent No.: US 6,973,240 B2
(45) Date of Patent: Dec. 6, 2005

(54) OPTICAL FILTER

(75) Inventor: Richard Michael Jenkins, Malvern (GB)

(73) Assignee: Qinetiq Limited, (GB)

( * ) Notice: Subject to any disclaimer, the term of this patent is extended or adjusted under 35 U.S.C. 154(b) by 5 days.

(21) Appl. No.: 10/492,678

(22) PCT Filed: Oct. 8, 2002

(86) PCT No.: PCT/GB02/04551
§ 371 (c)(1),
(2), (4) Date: Apr. 15, 2004

(87) PCT Pub. No.: WO03/036352
PCT Pub. Date: May 1, 2003

(65) Prior Publication Data
US 2004/0240775 A1 Dec. 2, 2004

(30) Foreign Application Priority Data
Oct. 20, 2001 (GB) .................................. 0125265

(51) Int. Cl.[7] .............................................. G02B 6/26
(52) U.S. Cl. ......................... 385/50; 398/48; 398/85; 385/27
(58) Field of Search ............................ 385/15, 27, 39, 385/50; 398/48, 85

(56) References Cited

U.S. PATENT DOCUMENTS 4,693,544 A   9/1987 Yamasaki et al.
5,410,625 A   4/1995 Jenkins et al.
5,640,474 A   6/1997 Tayag
5,862,288 A * 1/1999 Tayag et al. ................ 385/129

FOREIGN PATENT DOCUMENTS

JP    58-068713    4/1983

OTHER PUBLICATIONS

Jenkins et al. "Waveguide Beam Splitters and Recombiners Based on Multimode Propagation Phenomena", *Optics Letters*, pp. 991-993 (1992).
Banerji et al. "Laser Resonators with Self-Imaging Waveguides", *J. Opt. Soc. Am B.*, pp. 2378-2380 (1997).

* cited by examiner

Primary Examiner—John D. Lee
Assistant Examiner—Rhonda S. Peace
(74) Attorney, Agent, or Firm—McDonnell Boehnen Hulbert & Berghoff LLP

(57) ABSTRACT

An optical filter comprises a multimode waveguide, and first and second coupling waveguides which communicate with the multimode waveguide at respective ends thereof. Filtering is achieved by the effect of self-imaging in the multimode waveguide. The filter further comprises one or more series of aperture within the multimode waveguide, the or each series being located at a longitudinal position within the multimode waveguide at which 1-to-N way intensity division of an input optical field occurs, the optical field being the lowest order transverse mode of the coupling waveguides. The (one or more) series of apertures reduces the transmission of the filter at wavelength other than those corresponding to transmission peaks of filter's transmission function, thus providing improved filtering performance compared to prior art optical filters based on self-imaging.

10 Claims, 6 Drawing Sheets

$w_2 = 4\mu m$
$L = w_2^2/\lambda_0$ $w_2 = 8\mu m$
$L = w_2^2/\lambda_0$

OPTICAL FILTER

The invention relates to optical filters.

In the field of optics, wavelength filtering, i.e. extraction of an optical signal of a specific wavelength from a signal comprising a number of spectral components, is an important function. For example, in the field of optical communication, wavelength filtering allows a particular optical communication channel to be extracted from a plurality of wavelength-multiplexed channels, allowing that channel to be processed further; for example it might be amplified, routed or demodulated. In the field of optical communication, components for performing filtering and other operations are required to be integrated with other optical devices into integrated optical systems in which light is guided within fibre-optic or semiconductor waveguides. Devices currently used to perform filtering within such integrated optical systems include Bragg gratings, Fabry-Perot and Mach-Zehnder interferometers, array waveguide gratings (AWGs) and acousto-optic filters. Such devices are complex and therefore require a substantial amount of processing during their fabrication, as a result of which integrated optical systems incorporating them are expensive and time-consuming to produce. These devices are described, for example, in the book "Optical Networks—A Practical Perspective" by R. Ramaswami and K. N. Sivarajan (Morgan Kaufmann Publishers 1998, ISBN1-55860-445-6).

Optical filters based on the effect of self-imaging in a multimode waveguide are also known in the prior art: for example U.S. Pat. No. 5,862,288 discloses (in FIG. 1 thereof) a filter based on the principle of 1-to-1 imaging of an input optical field distribution over a distance $L=w^2/m\lambda_0$ within a multimode waveguide, where w is the width of the multimode waveguide and $m\lambda_0$ is the wavelength of guided plane wave radiation, which wavelength is passed by the filter in preference to radiation of other wavelengths. m is a positive integer. Such filters are easily fabricated and integrated with other optical and optoelectronic devices.

A problem associated with a filter of the latter type is that the filter's transmission function contains a significant amount of structure between transmission peaks associated with wavelengths $m\lambda_0$ and $(m+1)\lambda_0$, that is, the transmission of such a filter is non-zero at wavelengths between those which are required to be extracted from a plurality of spectral components. Such structure degrades filtering performance and in some filtering applications is unacceptable.

It is an object of the present invention to overcome or at least ameliorate this problem with filters based on the effect of self-imaging in a multimode waveguide.

According to a first aspect of the present invention, this object is achieved by an optical filter comprising (a) a multimode waveguide, and (b) first and second coupling waveguides which communicate with the multimode waveguide at respective ends thereof and which are arranged centrally of the multimode waveguide's transverse cross-section, wherein the length of the multimode waveguide is such that an optical field distribution, being the lowest order transverse mode of the coupling waveguides, introduced into the multimode waveguide via the first coupling waveguide is substantially reproduced on the multimode waveguide's central longitudinal axis at the end of the multimode waveguide remote from the first coupling waveguide, and coupled into the second coupling waveguide, for radiation of a wavelength to be passed by the filter in preference to radiation of other wavelengths by virtue of modal dispersion and inter-modal interference within the multimode waveguide, characterised in that the filter further comprises means presenting N apertures at a longitudinal position within the multimode waveguide at which 1-to-N way intensity division of said optical field occurs, the centre of each aperture being located at a lateral position within the multimode waveguide at which a local optical intensity maximum occurs when said division occurs.

The length of the multimode waveguide may be $pw_2^2/\lambda$, where p is a positive integer and $w_2$ is the width of the multimode waveguide. The full width at half maximum (FWHM) of transmission peaks of the transmission function of a filter of the invention are reduced if the length of the multimode waveguide is increased. In addition, this provides (p−1) transmission peaks in the transmission function of the filter between those peaks associated with wavelengths $m\lambda_0$ and $(m+1)\lambda_0$.

Preferably, the width $w_1$ of the coupling waveguides and the width $w_2$ are such that $w_2/w_1 > 8$. This provides a reduced FWHM of transmission peaks of the filter's transmission function.

According to a second aspect of the invention, there is provided a laser oscillator characterised by a filter according to the first aspect of the invention. Such a laser oscillator has an output with spectral characteristics fixed by filter's transmission function.

According to a third aspect of the invention, there is provided an optical device comprising a radiation source and characterised by a filter according to the first aspect of the invention. Such a device outputs radiation having a narrower spectral width than that of the radiation source alone.

Embodiments of the invention will now be described, by way of example only, with reference to the accompanying drawings in which.

Figure 1:
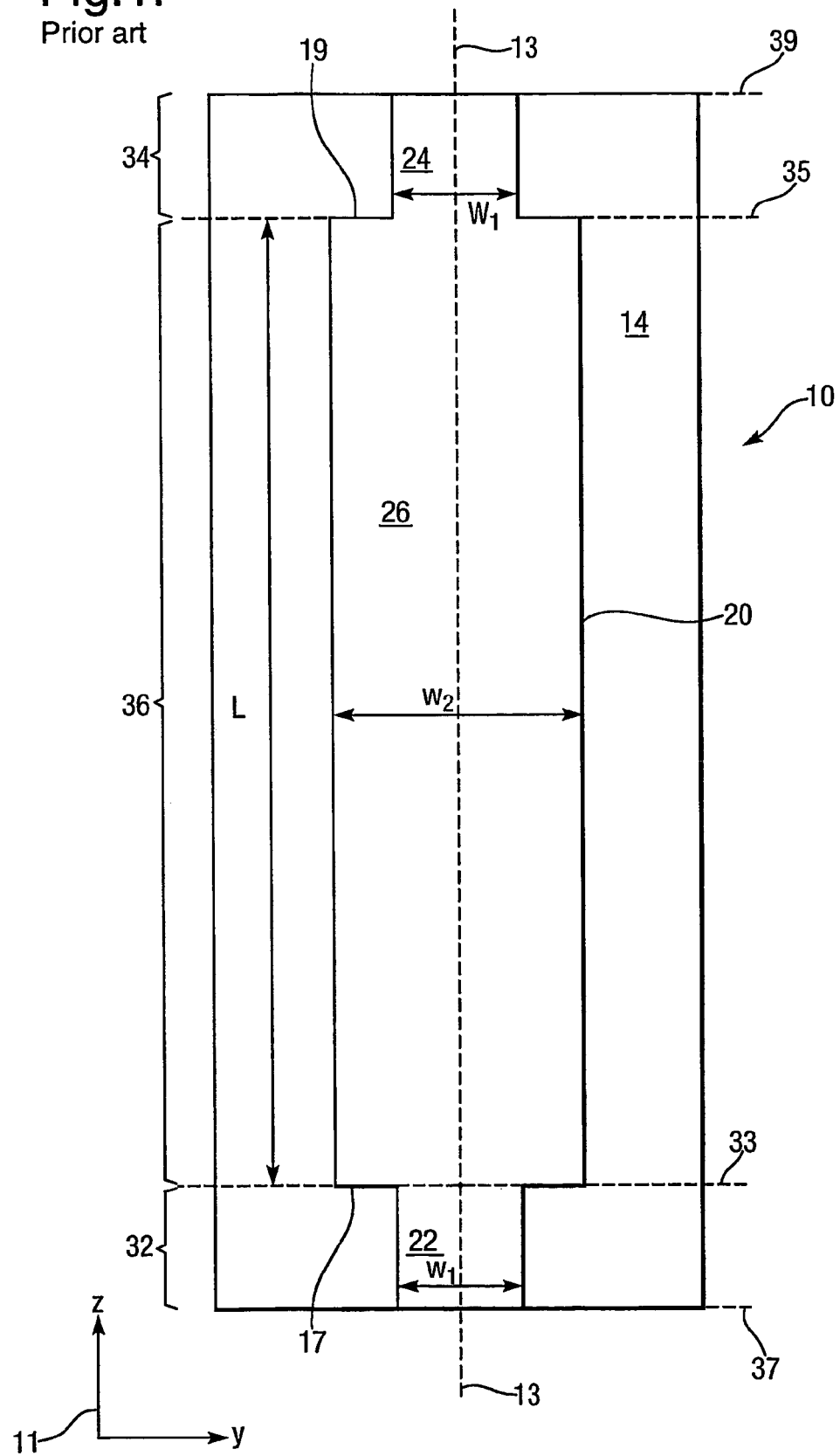
FIGS. 1 and 2 show plan and perspectives views respectively of a wavelength filter of the prior art.
Figure 2:
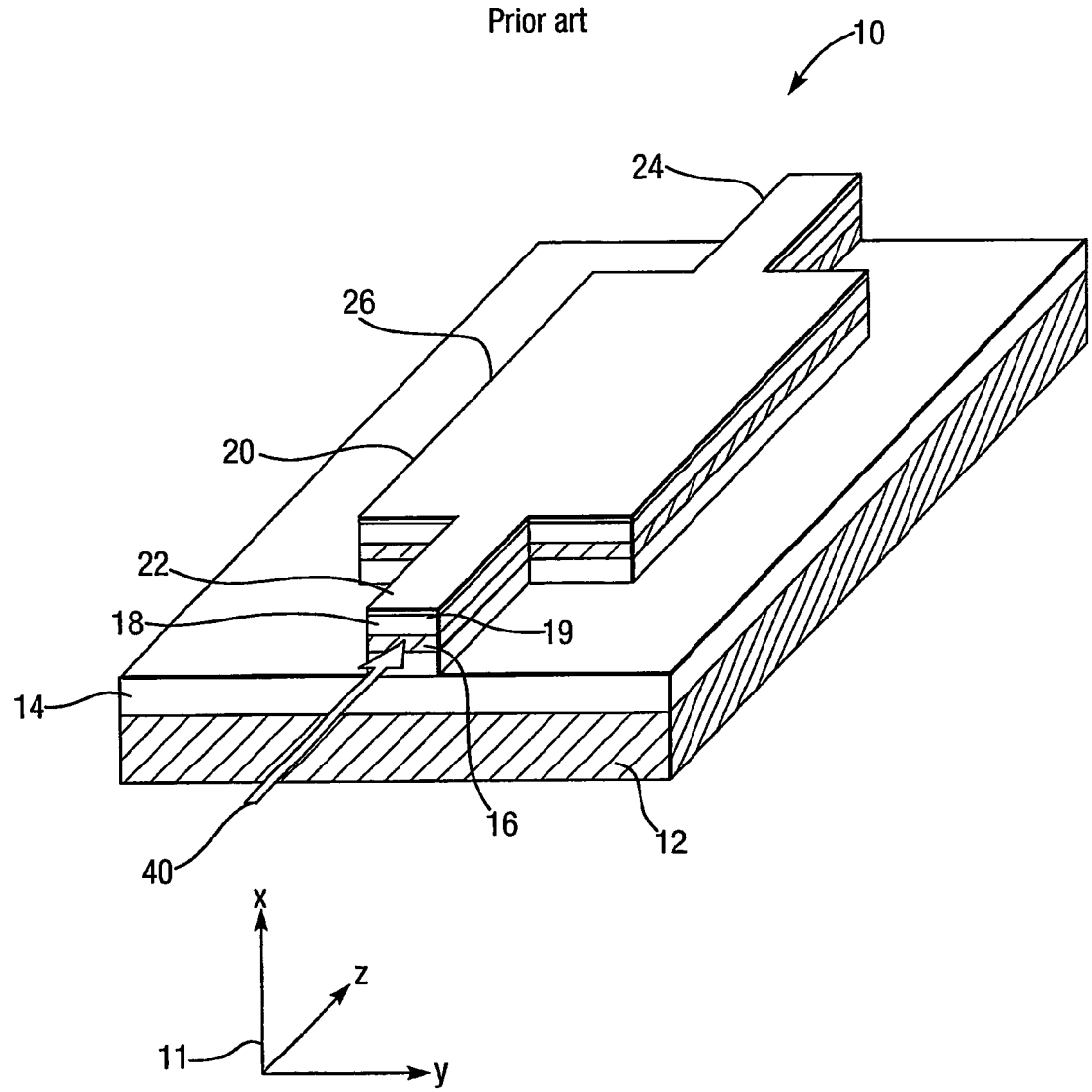

Referring to FIGS. 1 and 2 there are shown plan and perspective views respectively of a prior-art wavelength filter, indicated generally by 10, which passes radiation having a wavelength $m\lambda_0$ within the filter 10 in preference to radiation of other wavelengths. m is an integer and $\lambda_0 = 1$ μm. The device 10 is made by techniques familiar to those skilled in the art of semiconductor device fabrication and is referred to a co-ordinate system 11 which defines x- y- and z-directions. The device 10 comprises cladding layers 14, 18 of $Al_{0.1}Ga_{0.9}As$ which are 2.0 μm thick, a GaAs core layer 16 which is 1.0 μm thick and a GaAs capping layer 19 which is 0.1 μm thick. The layers 14, 16, 18, 19 are supported on a GaAs substrate 12. The layers 14, 16, 18 form a slab waveguide which is single-moded in the x-direction.

The device 10 has a ridge structure 20 (formed by etching) which incorporates layers 16, 18, 19 and a portion of layer 14. The ridge structure 20 has end regions 22, 24 of width $w_1 = 2$ μm corresponding respectively to end regions 32, 34 of the device 10, and a central region 26 of width $w_2=4$ μm corresponding to a central region 36 of the device 10. The width $w_1$ of the end regions 22, 24 of the ridge structure 20 is such that optical radiation guided within those regions and having a wavelength within the device 10 in the region of 1 μm is single-moded in both the x- and y-directions, i.e. the end regions 32, 34 of the device 10 are single-mode waveguides. The width $w_2$ of the central region 26 of the ridge structure 20 is such that radiation guided within the device 10 and having a wavelength within the device 10 in the region of 1 μm is in general multi-moded in the y-direction, i.e. the central region 36 of the device 10 is a multimode waveguide having ends 17, 19.

The end regions 22, 24 of the ridge structure 20 are located centrally of the transverse cross-section of the ridge structure's central region 26 and on its central longitudinal axis 13. The central region 26 of the ridge structure 20 has a length $L=w_2^2/\lambda_0=16$ μm. The central region 26 of the ridge structure 20 meets the end regions 22, 24 at xy planes 33 and 35 respectively. The filter 10 has an entry xy plane 37 at which optical radiation is introduced into the filter 10, and an exit xy plane 39 at which optical radiation exits the filter 10. The lengths of the end regions 22, 24 in the z-direction may take any convenient value: the filter 10 may be integrated on a single integrated-optical chip with other components and devices, for example amplifiers, modulators and the like.

The filter 10 operates as follows. Input optical radiation is introduced into the layer 16 substantially in the z-direction and at the entry xy plane 37 as indicated by an arrow 40 in FIG. 2. The input optical radiation comprises spectral components having wavelengths $m\lambda_0$ within the filter 10 which are to be passed by the filter 10 in preference to other spectral components of the input optical radiation. The input optical radiation propagates in the z-direction in the end region 32 of the device 10, substantially guided within the layer 16, as an optical field which is single-moded in both the x- and y-directions. As the optical field enters the central region 36 of the filter 10 at the xy plane 33, each spectral component of the input optical radiation excites a plurality of $EH_{i,j}$ transverse modes within that region, where j denotes mode index in the y-direction and is equal to an odd integer. Thus only symmetric modes of the central region (multimode waveguide) 36 are excited. ($n_{eff}=3.5$ for the device 10.)

A spectral component of the input optical radiation having a wavelengths $\lambda_i$ within the filter 10 has a wavelength $\lambda_i'=\lambda_i n$ in free space, where n is the refractive index for a plane wave within the layer 16. For example the spectral component of the input optical radiation having a wavelength $\lambda_0=1$ μm within the filter 10 has a wavelength $\lambda_0'=\lambda_0 n=3.5$ μm in free space.

Figure 3:
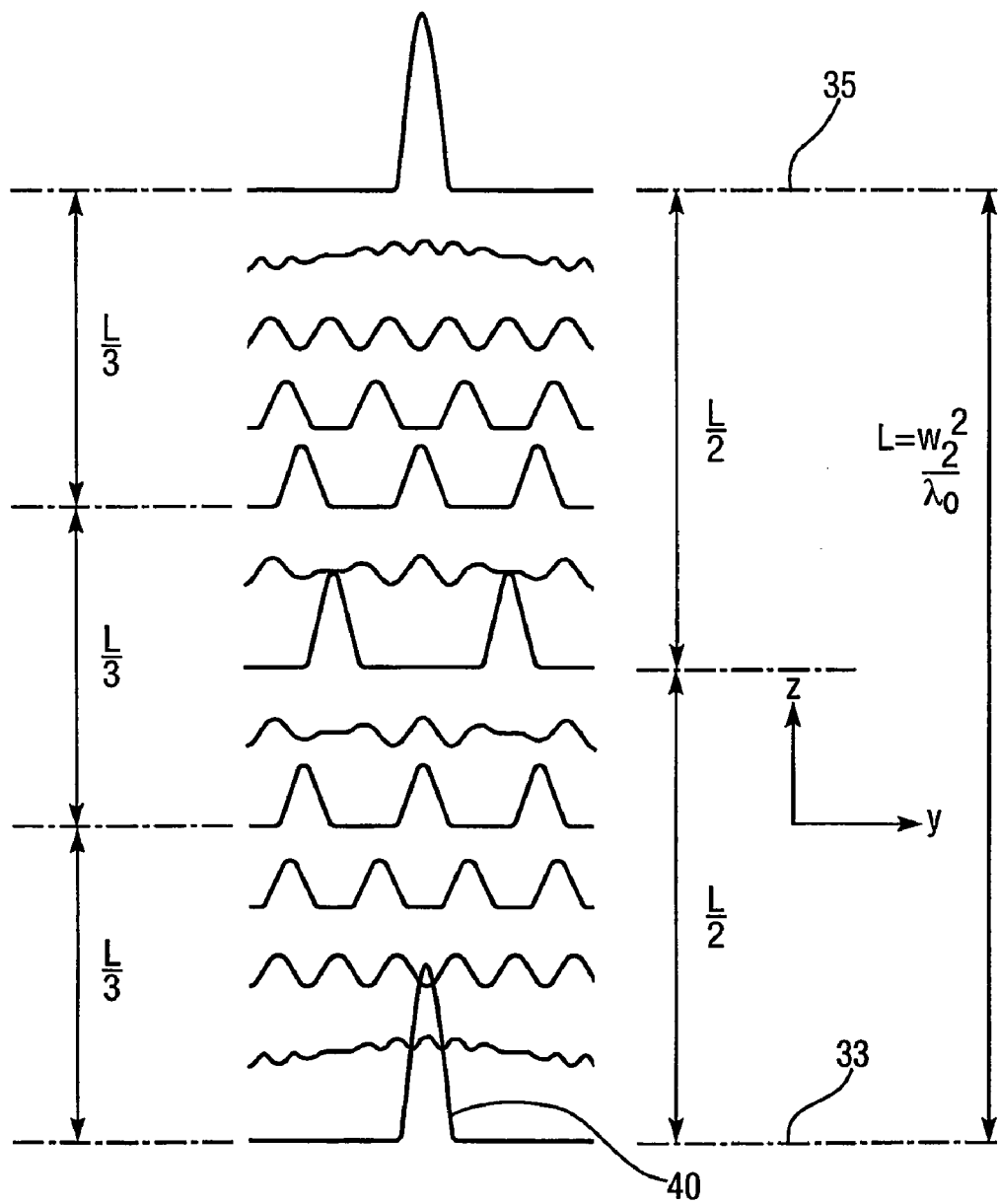
FIG. 3 illustrates the spatial distribution of an optical field as a function of distance within a portion of the filter of FIGS. 1 and 2.

As a result of modal dispersion and inter-modal interference within the central region 36, the intensity distribution in the y-direction of the spectral component of wavelength $\lambda_0$ varies with distance in the z-direction along the central region 36 of the device 10 as shown in FIG. 3. Referring to FIG. 3, the intensity distribution 40 in the y-direction at the xy plane 33 of the optical field of the spectral component having wavelength $\lambda_0$ is the $EH_{1,1}$ transverse mode of the central waveguide region 36. As a result of modal dispersion and inter-modal interference within the central region 36, this field distribution is substantially reproduced at the xy plane 35 and therefore couples efficiently into the end region 34 of the device 10. For a spectral component having a wavelength within the filter 10 other than $m\lambda_0$, where m is an integer, the intensity distribution 40 at the xy plane 33 is not reproduced at the xy plane 35, and hence the efficiency with which such a spectral component is coupled into the end region 34 of the device 10 is reduced compared to that for the spectral component $\lambda_0$. For example, a spectral component having a wavelength $\lambda_1>\lambda_0$ ($\neq m\lambda_0$) within the device would require the central region 36 of the filter 10 to be of length $w_2^2/\lambda_1<w_2^2/\lambda_0$ in order for the $EH_{1,1}$ transverse mode distribution of that spectral component at the xy plane 33 to be reproduced at the xy plane 35. Similarly, a spectral component having a wavelength $\lambda_2<\lambda_0$ ($\neq m\lambda_0$) would require the central region 36 of the filter 10 to be of length $w_2^2/\lambda_2>w_2^2/\lambda_0$ in order for the $EH_{1,1}$ transverse mode distribution of that spectral component at the xy plane 33 to be reproduced at the xy plane 35. Thus the filter 10 performs a filtering function, spectral components of wavelength $m\lambda_0$ in the input radiation being passed in preference to other spectral components.

Figure 4:
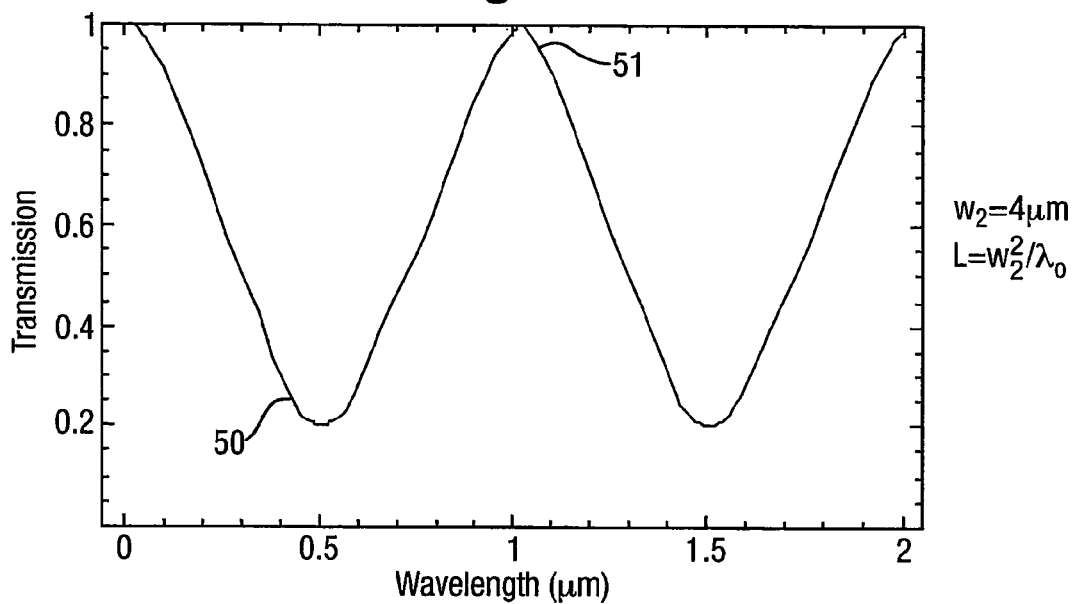
FIG. 4 is graph of transmission versus wavelength of input radiation for the filter of FIGS. 1 and 2.

Referring now to FIG. 4, transmission of the filter 10 in the region 0–2 μm is shown as a function of wavelength (within the filter 10) of input radiation by a curve 50. The curve 50 is periodic with respect to wavelength: wavelengths $m\lambda_0$ in the input radiation are passed by the filter 10 with substantially 100% efficiency, where m is an integer. Transmission peaks such as 51 of the curve 50 have a full width at half-maximum (FWHM) of approximately 560 nm.

Another wavelength filter of the prior art has a construction like to that of the filter 10, except that end regions 22, 24 of the ridge structure 20 are multi-mode waveguides in the y-direction rather than single-mode waveguides in the y-direction. In operation of the alternative device, input optical radiation is introduced at the xy plane 37 such that only the lowest order transverse mode is excited in the end region 32 of the device.

Figure 5:
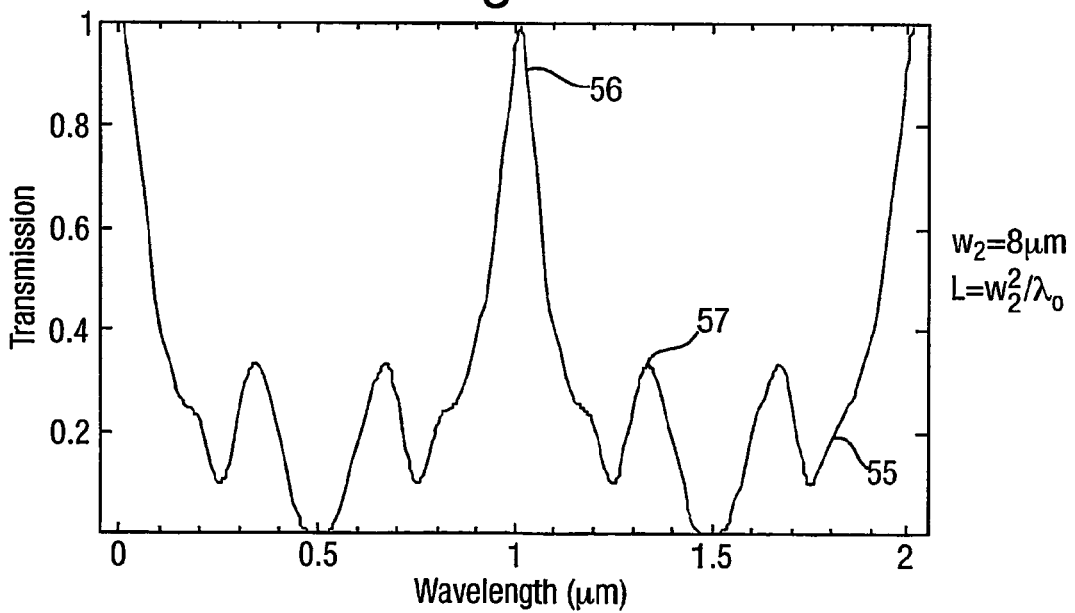
FIGS. 5 to 7 are graphs of transmission versus wavelength of input radiation for further wavelength filters of the prior art.

Referring now to FIG. 5, transmission versus input wavelength is shown for a further prior-art wavelength filter of the invention in the region 0–2 μm by a curve 55, the filter having construction like to that of the filter 10, except that $w_2=8$ μm. The curve 55 is periodic with respect to wavelength: wavelengths $m\lambda_0$ within the input radiation are passed with substantially 100% efficiency, where m is an integer. Transmission peaks such as 56 have a FWHM of approximately 150 nm.

Figure 6:
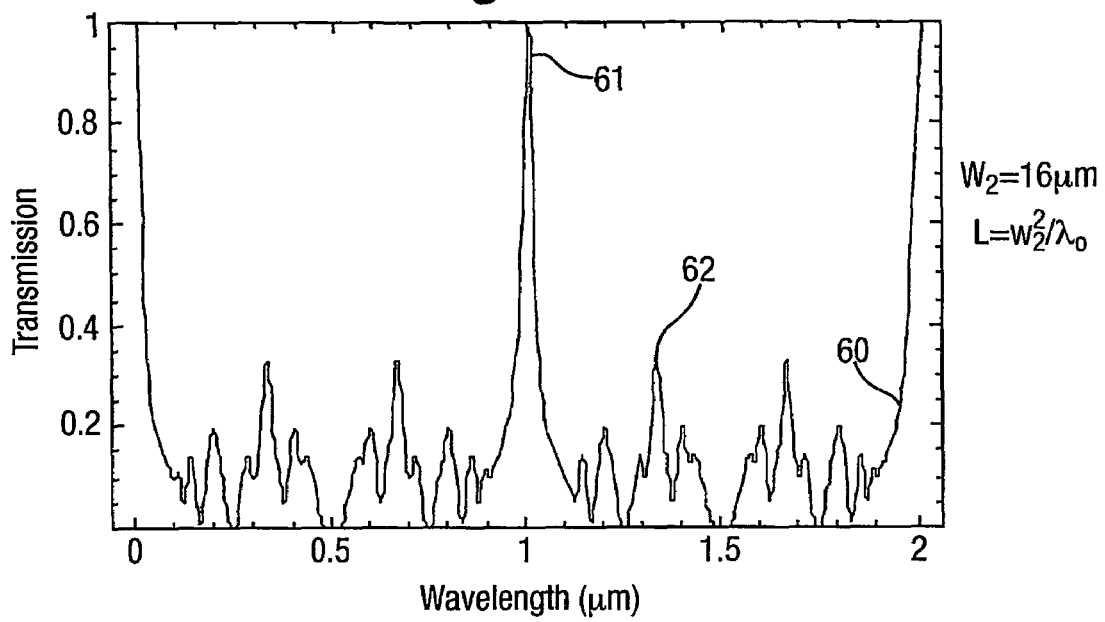

Referring now to FIG. 6, transmission versus input wavelength is shown for a still further wavelength filter of the prior art for the region 0–2 μm by a curve 60, the filter having construction like to that of the filter 10, except that $w_2=16$ μm. The curve 60 is periodic with respect to wavelength: wavelengths $m\lambda_0$ are passed with substantially 100% efficiency, where m is an integer. Transmission peaks such as 61 have a FWHM of approximately 34 nm.

Figure 7:
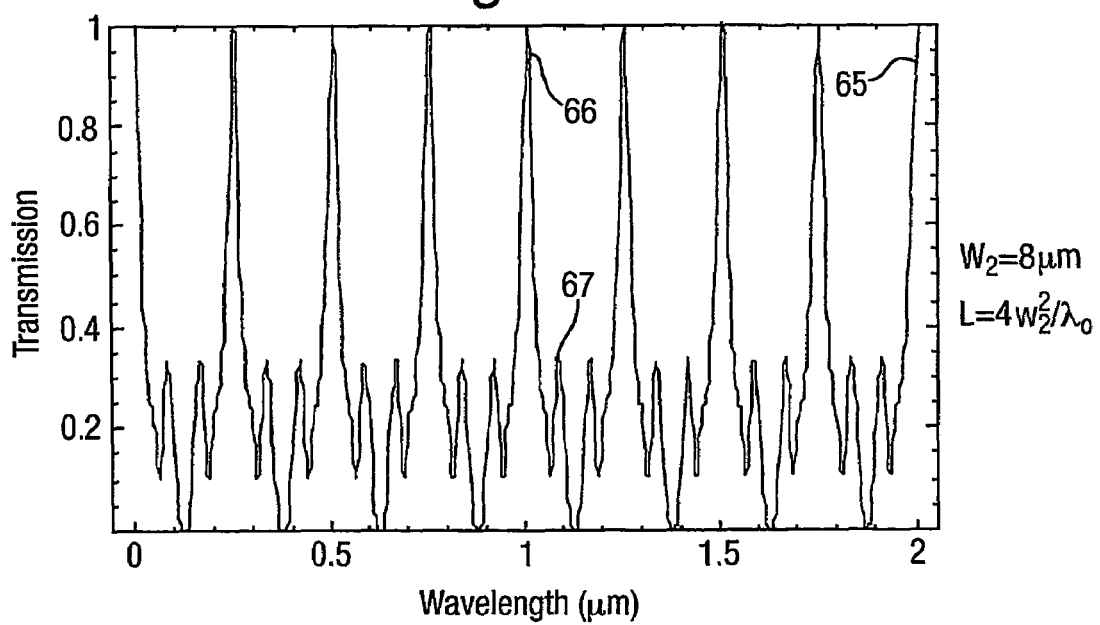

Referring now to FIG. 7, transmission versus input wavelength is shown for a yet further wavelength filter of the prior art in the region 0–2 μm by a curve 65, the device having construction like to that of the filter 10, except that $w_2=16$ μm and $L=4w_2^2/\lambda_0=64$ μm. The curve 65 is periodic with respect to wavelength: wavelengths $m\lambda_0/4$ are passed with substantially 100% efficiency, where m is an integer. Transmission peaks such as 66 have a FWHM of approximately 34 nm.

The transmission curves 55, 60, 65 have side-lobes such as 57, 62, 67. Such side-lobes are unacceptable in some filtering applications.

From FIGS. 4 to 7 it may be seen that the FWHM of transmission peaks of filters of the invention such as 10 may be varied by varying the structure of the filter so as to vary the value of $w_2/w_1$. The FWHM of a transmission peak is proportional to $(w_1/w_2)^2$.

The number of wavelengths passed by the filter with substantially 100% efficiency may be increased by increasing the length of the filter's central region: a filter having a central region of length $pw_2^2/\lambda_0$ will pass spectral components of the input radiation having wavelengths $m\lambda_0/p$ with substantially 100% efficiency, where m and p are integers. Increasing the length of the central region also reduces the FWHM of transmission peaks of the transmission function of a filter of the invention.

Figure 8:
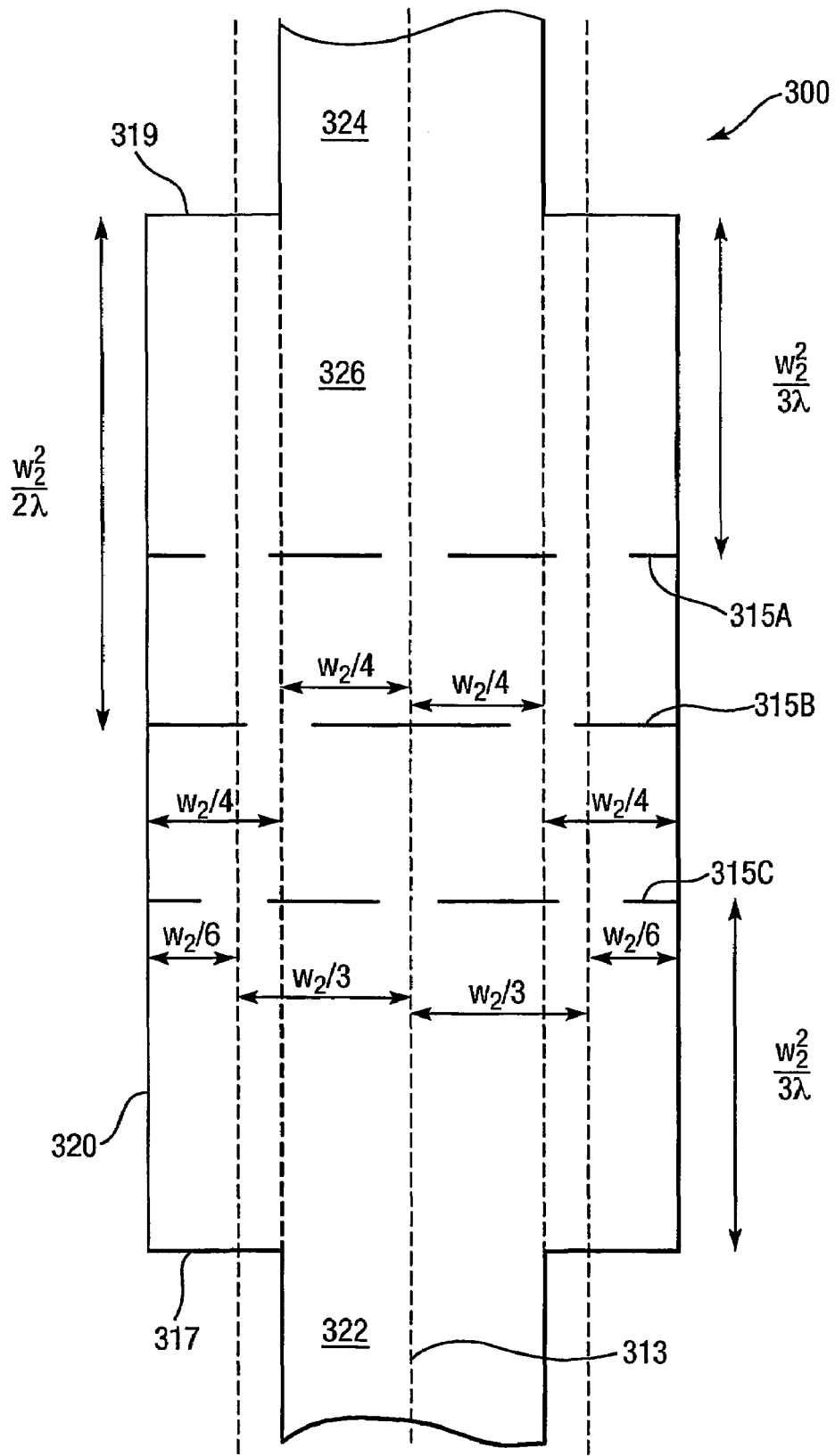
FIG. 8 shows a plan view of a wavelength filter of the present invention.

Referring now to FIG. 8, there is shown an optical filter of the invention, indicated generally by 300. The filter 300 has a construction and dimensions like to that of the filter 10. The filter 300 has three sets of apertures 315A, 315B, 315C formed by etching grooves into the multimode waveguide 326 of the filter 300. The grooves are of a depth such that they pass completely through the core waveguide layer of the filter 300. The sets of apertures 315A and 315C are each located at a distance $w_2^2/3\lambda_0$ from respective ends 319, 317 of the multimode waveguide 326 and each consists of three apertures the centres of which are positioned at $w_2/6$, $w_2/2$ and $5w_2/6$ from one side of the filter's multimode waveguide 326. The set of apertures 315B is located at a distance $w_2^2/2\lambda_0$ from each of the ends 317, 319 of the multimode waveguide 326 and has two apertures at distances of $w_2/4$ and $3w_2/4$ from one side of the multimode waveguide 326. The grooves may be formed by any suitable method of semiconductor processing, for example focused ion-beam etching.

Referring again to FIG. 3, the z-positions of the three sets of apertures 315A, 315B, 315C can be seen to coincide with z-positions in the multimode waveguide 326 at which one-to-two and one-to-three way splitting of input radiation of wavelength $\lambda_0$ occurs. The centre of each aperture is located at a lateral position within the waveguide 326 at which a local maximum occurs in the intensity distribution at the corresponding z-position.

The sets of apertures 315A, 315B, 315C cause suppression of side-lobes (such as 57, 62, 67 in FIGS. 4, 5 and 6 respectively) in the transmission function of the filter 300 thus giving enhanced filtering performance. Side-lobes may be further suppressed by additionally providing apertures at other z-positions within the multimode waveguide 326 where 1-to-N way splitting of an input intensity distribution occurs. Side-lobe suppression may also be achieved in filters of the invention which have multimode waveguides of length $pw_2^2/\lambda_0$, where p is an integer, by appropriate positioning of such apertures.

Wavelength filters of the invention may modified to produce to produce laser oscillators. For example the device 10 may be modified to provide an optical gain element within any or all of the regions 22, 24, 26 of the ridge structure 20, and optical feedback means (e.g. mirrors formed by cleaving) at ends of the regions 22, 24 meeting xy planes 37, 39 respectively. Such a laser oscillator has a spectral output determined by the wavelength filter device which forms its resonator.

A filter of the invention may be combined with a radiation source to produce an optical device which outputs radiation having a narrower spectral width than that of the radiation source alone.

What is claimed is:

1. An optical filter comprising
   (a) a multimode waveguide; and
   (b) first and second coupling waveguides which communicate with the multimode waveguide at respective ends thereof and which are arranged centrally of the multimode waveguide's transverse cross-section;
   wherein the length of the multimode waveguide is such that an optical field distribution, being lowest order transverse mode of the coupling waveguides, introduced into the multimode waveguide via the first coupling waveguide is substantially reproduced on the multimode waveguide's central longitudinal axis at the end of the multimode waveguide remote from the first coupling waveguide, and coupled into the second coupling waveguide, for radiation of a wavelength to be passed by the filter in preference to radiation of other wavelengths by virtue of modal dispersion and inter-modal interference within the multimode waveguide,
   characterised in that the filter further comprises means presenting N apertures at a longitudinal position within the multimode waveguide at which 1-to-N way intensity division of said optical field occurs, the centre of each aperture being located at a lateral position within the multimode waveguide at which a local optical intensity maximum occurs when said division occurs.

2. A filter according to claim 1 wherein the multimode waveguide has a length $pw_2^2/\lambda$, where p is a positive integer, $w_2$ is the width of the multimode waveguide and $\lambda$ is the wavelength, within the multimode waveguide's core layer, of radiation to be passed by the filter in preference to radiation of other wavelengths.

3. A filter according to claim 1 wherein the coupling waveguides have a width $w_1$, the multimode waveguide has a width $w_2$ and $w_2/w_1 > 8$.

4. A laser oscillator characterised by a filter according to claim 1.

5. An optical device comprising a radiation source and characterised by a filter according to claim 1.

6. A filter according to claim 2 wherein the coupling waveguides have a width $w_1$, the multimode waveguide has a width $w_2$ and $w_2/w_1 > 8$.

7. A laser oscillator characterised by a filter according to claim 2.

8. A laser oscillator characterised by a filter according to claim 3.

9. An optical device comprising a radiation source and characterised by a filter according to claim 2.

10. An optical device comprising a radiation source and characterised by a filter according to claim 3.

* * * * *